UNITED STATES PATENT OFFICE.

ROBERT WAHL AND ARNOLD S. WAHL, OF CHICAGO, ILLINOIS.

ART OF BREAD-MAKING.

1,247,349.  Specification of Letters Patent.  Patented Nov. 20, 1917.

No Drawing.  Application filed September 12, 1916.  Serial No. 119,725.

*To all whom it may concern:*

Be it known that we, ROBERT WAHL and ARNOLD S. WAHL, citizens of the United States, residing at Chicago, in the county of Cook and State of Illinois, have invented a new and useful Improvement in the Art of Bread-Making, of which the following is a specification.

Our invention relates to the art of manufacturing bread or the like baked farinaceous food products. We have found that a considerable improvement in the quality of such products may be obtained by adding to the dough a mash produced from any diastase-containing material, such, for instance, as malt, malt sprouts, or wheat bran, rye bran, or other product representing the aleurone layer of seeds, either with or without gelatinized starch. The mash so produced will contain the products of inversion of the starch and also the compounds formed by the peptonizing and proteolyzing of the proteids in the mash, together with dissolved mineral substances, all of which products are valuable yeast foods and as such effect an improvement in the quality of the bread by stimulating the development of the yeast in the dough. Furthermore, by the use of a proper proportion of starch-bearing material, such as corn-meal, corn flakes, rice, wheat flour, or corn starch, and by attention to the conditions of mashing, the amount of maltose produced in the mash by inversion of the starch may be so increased that there will be a surplus over that required for the development of the yeast, and such surplus will notably improve the bread, particularly as to the taste and bloom of the crust.

The production of sugar in this manner by the baker alone effects a considerable saving, since the starch which is transformed into sugar in the process and which may be either in the form of pure corn starch, or as a constituent of the above mentioned starch-bearing materials is far cheaper than the market grades of sugar. It is also a fact that the variety of sugar produced by the inversion of starch, *i. e.*, maltose, is more desirable than cane or beet sugar (saccharose), or corn sugar (dextrose), being identical with the sugar contained in flour and more readily caramelizable than is saccharose or dextrose, and yielding a richer and more appetizing bloom without excessive sweetening. Thus to produce the desired bloom requires from 2 to 4 pounds of cane or beet sugar per barrel of flour, which in the higher proportion may result in a relatively sweet crumb, while if the proportion of sugar be so far reduced as to have no sweetening effect, an inferior bloom may result. Owing to its lower sweetening value the desired proportion of maltose for obtaining the richest bloom may be used without altering the flavor of the crumb.

In the practice of our invention we proceed substantially as follows:

1. *Malt mash.*

The malt, which should of course be of high diastatic power, is crushed and mixed with four times its weight of water at a temperature of 45° C., for instance, 65 pounds of crushed malt may be used for each barrel of water of 31 gallons; the temperature is held at 45° C. for approximately 30 minutes, during which time the peptase of the malt exerts a peptonizing or digesting action rendering soluble and assimilable the albuminous and other proteid substances of the malt, while with the addition of live steam or boiling water the temperature is raised in a period of about 30 minutes to a mashing temperature of 62 to 65° C., which is most favorable to the complete inversion of the starch. The temperature is held for one hour at this point to obtain the maximum production of maltose and to lower the dextrin content of the mash in so far as possible. The mash is now cooled, and should show a saccharometer indication of about 12 to 20° for evidencing an extract percentage of 12 to 20, the exact concentration depending upon the portion of water used in mashing. It will be found that with a concentration of about 17 per cent. of extract, 14 per cent. or thereabout will be maltose or equivalent reducing sugars, that is about 80 per cent. of the total extract in the mash will be maltose.

The process may be carried out in a standard brewer's mash tun or in a wooden tub provided with a stirrer false bottom and drain pipes ending in taps to drain the clear wort from the mash tun through a filter bed of malt husks, spent bran, or spent malt sprouts, resting upon the false bottom.

For every barrel of flour about six gallons of this mash is added to the dough, the mash replacing an equal quantity of water. Salt and the other ingredients of the dough are added as in the ordinary practice, the mash, however, carrying with it and therefore replacing the sugar, malt extract, or other yeast foods and bread improvers now used.

2. *Malt and starch.*

The starchy material may be treated according to any of the well-known methods to gelatinize it. It may either be boiled in an open tub or in a closed cooker. Corn starch, for instance, should be boiled from 10 to 15 minutes with about three times its weight of water; rice meal or rice flour should be boiled with about four times its weight of water for from 15 to 30 minutes, while corn meal or corn grits should be boiled for a considerably longer period, perhaps one hour. Mazam or corn flakes which have been previously gelatinized in their processes of manufacture need not be boiled but may be added dry after the mash has reached a temperature of 65° C. In all cases, (except where using mazam or corn flakes) it is desirable to employ in the cooker from 20 to 25 per cent. of ground malt (percentage by weight with reference to the starch used), adding the ground malt to the starch mixer when the latter is at a temperature of about 45° C., slowly raising the temperature to about 70° C., and holding the mash at this temperature for about 30 minutes previous to boiling. The employment of malt in this manner is of considerable value since the malt effects a partial inversion and produces a thin boiling mixture which is easier to handle than is the relatively thick paste produced by gelatinizing starch without the use of malt. The thin boiling starch mash may be drawn directly from the cooker to the mash tun in which the malt mash has previously been prepared, the peptonizing of the malt mash at 45° C. having preceded simultaneously with the gelatinizing of the starch. The addition of the boiling starch mixture to the malt mash will ordinarily be sufficient to bring the temperature of the latter up to the desired inversion temperature of approximately 65° C.

3. *Malt and flour.*

The malt is mashed as given under 1 *supra*, together with the flour, employing 800 to 1,000 parts of water to 100 parts of malt and 200 parts of flour, the initial temperature at which mixing is effective being preferably about 48° C. This temperature is held for 30 minutes, during which time peptonization takes place, and at the end of this time the temperature is raised from 65 to 70° C. and mashing proceeded with for one hour or longer until about 84 per cent. of the soluble solids in the mash is maltose. The mash is now cooled to the dough-mixing temperature and incorporated with the dough, employing about 6 gallons of mash containing approximately 17 per cent. extracts to one barrel of flour.

4. *Wheat-bran, etc.*

Wheat bran, rye bran, corn croppings, pea bran, or other vegetable product representing the aleurone layer of the seed and carrying translocation diastase, may be used in place of the malt or malt sprouts for forming the mash. The materials enumerated are of particular value since they carry not only the required diastase, but also nitrogenous and mineral constituents which form valuable yeast foods. In general, it is desirable to employ lactic acid liquor of an acidity of about 2 per cent. in mashing with these last-named materials, the lactic acid serving to peptonize the proteid of the bran, etc., and to re-act upon the phosphates and other mineral substances present to render them soluble and assimilable. We have found that we can and preferably do employ in the mash as much lactic acid as will produce a neutral mash, that is, change all basic phosphates to acid phosphates without interfering unfavorably with diastatic action of the bran. We may also proceed to propagate directly enough lactic acid to point of neutrality adding only enough lactic liquor for proper inoculation or starter. Naturally the larger the amount of lactic acid added or the further propagation is allowed to proceed, the larger will be the amount of phosphates and albumin extracted from the bran. The stage of acidity (litmus as indicator) should, however, not be reached as the inversion of starch by diastase would thereby be unfavorably affected. We have found that the diastatic strength of bran is sufficient to invert 4 to 8 times its weight of mazam into sugar and dextrin, preferably at about 48° C. This temperature is held for one to two hours, during which time peptonization takes place and at the end of this time the temperature is raised to 60 to 65° C., and mashing proceeded with for one hour or longer until about 80 per cent. of the soluble solids in the mash is maltose. The mash is now cooled to the dough-mixing temperature and incorporated with the dough, employing about 6 gallons of mash containing approximately 17 per cent. extracts to one barrel of flour. The preferred mashing temperatures and the exact procedure to be followed to obtain the best results from the use of these materials is fully described in the patent to Robert Wahl, No. 1,178,039, of April 4, 1916.

5. *Malt extract.*

The market grades of malt extract which carry diastase in an active condition may be employed to effect inversion of the starch in accordance with the methods above given.

In practising our improved process for the production of baked goods, the best results both from an economical and technical standpoint may be obtained by making use of the mash as a yeast developer prior to mixing the mash with the dough. If a considerably smaller proportion, for instance, ½ to ¼, of the yeast ordinarily employed be added to the mash when the latter is completed, the yeast will develop and multiply, under proper conditions, a vigorous fermentation being started in the mash where the yeast is free to develop. When the development has proceeded to the desired degree, the mash which is at that time thoroughly impregnated with carbon dioxid may be added to the dough, thus incorporating intimately with the dough living yeast cells and the food required for the sustenance and growth of the same. This method of operation is more economical since it requires a smaller proportion of the yeast, and gives a better technical result than may be obtained by the ordinary method of simply dissolving compressed yeast, for instance, in water and mixing the solution with the sponge or straight dough. In this latter and commonly practised method, the individual yeast cells are enveloped by the dough and are held in place so that they cannot separate. During the development of the yeast therefore in the dough, it displays a tendency to remain in colonies which colonies produce large holes in the bread at certain points due to the formation of an excessive amount of carbon dioxid by the densely populated colony and at other points give inferior aeration, owing to the relatively large proportion of inactive cells at such points. This effect i. e., unequal distribution of gas in the crumb is avoided by our method of operation since the yeast cells separate themselves more perfectly during their development in the mash, and when the mash is added to the dough there is therefore produced a homogeneous mixture.

Where the yeast is added to the mash before the introduction of the latter into the dough, it may be preferable to incorporate with the mash the entire quantity of water to be used in the dough, thus reducing the concentration of the mash to about 5 per cent. extract or lower. The yeast production in this dilute mash may then be carried out with the air of aeration, for instance, as is customary in the production of yeast on a large scale.

While we have described in considerable detail the procedure which may be followed in carrying out our invention it is to be understood that this description is illustrative only and for the purpose of making clear the principles underlying and the nature and objects of the various steps to be followed in obtaining the advantages of the invention, and that we do not regard our invention as limited to the specific procedure outlined or to any feature thereof except in so far as we have included such limitations within the terms of the following claims, in which it is our intention to claim all novelty inherent in our invention as broadly as is permissible in view of the prior art.

What we claim as new and desire to secure by Letters Patent is:

1. In the art of preparing baked farinaceous food products, the steps which consist in preparing a mash containing phosphates, proteids and the peptonizing enzym of malt, subjecting such mash to the action of the peptonizing enzym at a temperature of substantially 45° C. and adding the mash to the dough.

2. In the art of preparing baked farinaceous food products, the steps which consist in preparing a mash containing phosphates, proteids, lactic acid and the peptonizing enzym of malt, subjecting such mash to the peptonizing and digesting effect of the said enzym and acid at a temperature of substantially 45° C. and adding the mash to the dough.

3. In the art of producing baked farinaceous food products, the steps which consist in preparing a mash containing phosphates, proteids, starch, the peptonizing enzym of malt and diastase, mashing under conditions favoring the activity of the peptonizing enzym at a temperature of substantially 45° C. subsequently mashing under temperatures and conditions favoring the activity of the diastase and adding the completed mash to the dough.

4. In the art of producing baked farinaceous food products, the steps which consist in preparing a mash containing phosphates, proteids, lactic acid in amount not greater than is required to neutralize the mash, starch, a peptonizing enzym and diastase, and mashing under conditions favoring the activity of the peptonizing enzym, acid and diastase, and adding the completed mash to the dough.

5. In the production of baked farinaceous food products, the steps which consist in preparing a mash containing proteids, phosphates, disastase and an agent capable of proteolyzing the said proteids and rendering soluble and assimilable the said phosphates, subjecting said mash to conditions favoring the activity of the said agent, adding starch, mashing at a temperature favoring the inversion of the starch, and incorporating the finished mash in the dough.

6. In the production of baked farinaceous food products, the steps which consist in preparing a mash containing the aleurone layer of seeds, subjecting the said mash to conditions favoring the proteolyzing of the proteids and the digestion of the mineral substances carried by the said seed portion, adding starch, mashing at a temperature favoring the inversion of the starch by the disastase carried by the said seed portions, and incorporating the finished mash in the dough.

7. In the production of baked farinaceous food products, the steps which consist in preparing a mash containing the aleurone layer of seeds and lactic acid, subjecting the said mash to conditions favoring the proteolyzing of the proteids and the digestion of the mineral substances carried by the said seed portion, adding starch, mashing at a temperature favoring the inversion of the starch by the diastase carried by the said seed portions, and incorporating the finished mash in the dough.

8. In the art of preparing baked farinaceous food products, the steps which consist in preparing a mash containing starch, a diastatic agent, proteids, phosphates and a proteolyzing agent, mashing under conditions favoring the activity of the said agents, adding yeast to the finished mash, developing the yeast therein, and adding the yeast-carrying mash to the dough.

9. In the art of preparing baked farinaceous food products, the steps which consist in preparing a mash containing starch, a diastatic agent, lactic acid, proteids, phosphates and a proteolyzing agent, mashing under conditions favoring the activity of the said agents, adding yeast to the finished mash, developing the yeast therein, and adding the yeast-carrying mash to the dough.

10. In the art of preparing baked farinaceous food products, the steps which consist in adding yeast to a solution of yeast food or bread improver having a cereal base, permitting the development of the yeast in the said solution whereby the solution becomes impregnated with carbon dioxid, and adding the impregnated solution carrying the yeast therewith to the dough.

11. In the art of preparing baked farinaceous food products, the steps which consist in preparing a mash containing phosphates, proteids, lactic acid and a peptonizing enzym, subjecting such mash to the action of the said enzym and acid, adding yeast to the finished mash, developing the yeast therein and adding the yeast-carrying mash to the dough.

ROBERT WAHL.
ARNOLD S. WAHL.